United States Patent Office 3,563,105
Patented Feb. 16, 1971

3,563,105
TOOTHED MESHING TRANSMISSION MECHANISMS
Roberto Graziosi, Brescia, Italy, assignor to Istituto per le Ricerche di Tecnologia Meccanica, Turin, Italy
Claims priority, application Italy, Oct. 12, 1968, 53,476/68
U.S. Cl. 74—410                                                13 Claims

ABSTRACT OF THE DISCLOSURE

In order to evenly and smoothly transmit a rotary motion from a driving shaft to a toothed driven member, the member meshes with a pair of driving pinions arranged coaxially on the shaft; one of the pinions is helically splined to the shaft and the shaft is axially floating with respect to said one of the pinions, while the other pinion is formed either with helical splines coupling it to the shaft or with helical teeth meshing with the member, the inclination of said helical splines or teeth being opposite to that of the splines between said one of the pinions and the shaft.

---

The invention relates to toothed meshing transmission mechanisms, and concerns a device for automatically distributing loads and/or taking up play in such mechanisms.

Devices have previously been suggested for the above purposes, particularly for evenly distributing loads between two pinions that mesh with a rack or with a ring gear, or for automatically taking up play between the intermeshing members.

An object of this invention is to provide a simple device which will evenly distribute loads between two pinions driving a driven member or take up play between the intermeshing members. In the device of the invention the angles of set of the teeth of the intermeshing members are not restricted by their diameters or by similar parameters of said members. This allows the use of spur teeth on the intermeshing pinions and driven member, thus eliminating or reducing axial forces on these members compared with known devices.

A further object of the invention is to provide a device which will improve the mechanical efficiency of a transmission by reducing mutual friction forces of the intermeshing members.

With the above and further objects in view, which will be clear from the description below, the invention provides a toothed meshing transmission mechanism including a driving wheel keyed to a driving shaft for relative axial displacement, a first and a second toothed pinion each coaxially connected to the driving shaft, at least the first pinion being capable of axial displacement relatively to the driving shaft, and a toothed driven member mounted to mesh with both the first and second pinions; at least the first pinion is keyed to the driving shaft by helical splines.

According to an embodiment of the invention both pinions are connected to the driving shaft by helical splines, the helices of the two pinion connections being oppositely inclined to each other.

Figure 1:
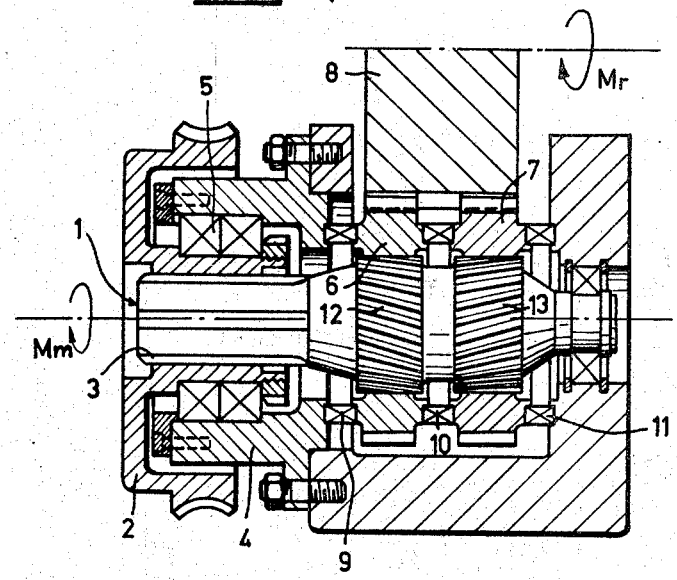
Figure 2:
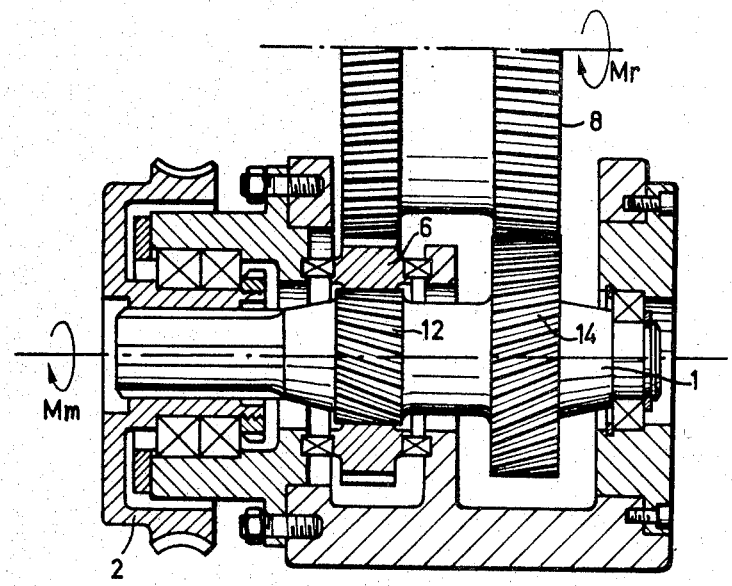
Figure 3:
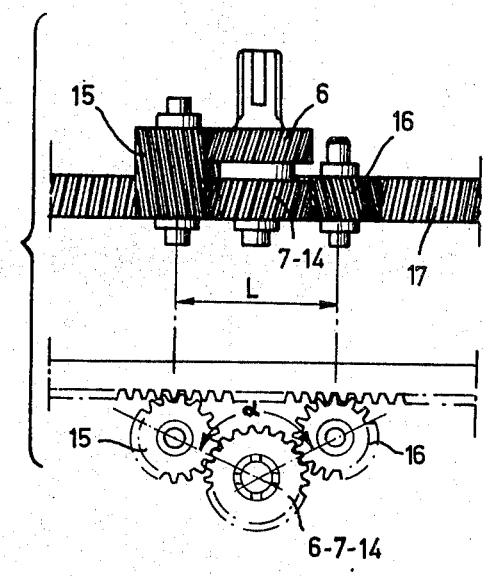
Figure 4:
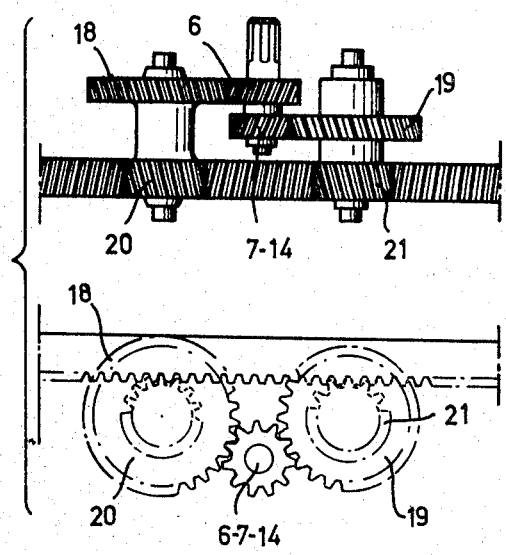

Further characteristic features and advantages will be understood from the following detailed description with reference to the accompanying drawings, given by way of example only, wherein:

FIG. 1 is a diagrammatic longitudinal sectional view of an embodiment of the device, FIG. 2 is a view similar to FIG. 1 of a modified embodiment; and FIGS. 3 and 4 are diagrammatic plan views showing corresponding manners of using a device of the invention.

Referring to FIG. 1, 1 denotes a shaft which receives a driving moment $Mm$ through a driving wheel 2 rotated by means such as a worm wheel meshing with a worm screw, not shown in the drawing.

The shaft 1 will be referred to hereafter as the driving shaft.

The driving wheel 2 is keyed to the shaft 1 by means of axial splines 3 which allow relative axial displacements between the wheel 2 and the shaft. The wheel 2 is mounted in a casing 4 in antifriction bearings 5.

The driving shaft 1 further carries first and second pinions 6, 7 arranged alongside each other and meshing with associated sets of teeth on a driven member generally denoted by 8, which may be in the form of a toothed gear or ring gear or a rack. It is subjected to a resistance moment $Mr$ or a corresponding resistance force.

According to the invention at least one pinion 6 or 7 is held against axial displacement.

In the embodiment shown in FIG. 1, both pinions 6 and 7 are held against axial displacement by thrust bearings 9, 10 and 11.

The pinions 6, 7 carry internal helical splines and are each connected to the shaft 1 by corresponding helical splines 12, 13, respectively, the helices of the two pairs of interlocking splines being oppositely inclined.

The device operates as follows:

When the driving shaft 1 is rotated in the direction shown by the driving moment $Mm$ and if one of the pinions, say the pinion 6, is in driving mesh with the teeth on the transmission member 8 while the pinion 7 is only loosely meshed, the resistance $Mr$ tending to oppose rotation of the pinion 6 causes the shaft 1 to move axially relatively to the wheel 2 and pinions 6 and 7, such movement being permitted by the splined connections.

The helical splines 13 consequently rotate the pinion 7 in the direction of the driving moment $Mm$, causing the teeth on the pinion 7 to mesh drivingly with the associated teeth on the driven member 8.

At this stage motion starts to be transmitted to the driven member 8, the load from the driving moment $Mm$ being evenly distributed between the two pinions 6 and 7.

An important feature is that, because the pinions 6 and 7 are connected to the shaft 1 by interlocking helical splines, the nature of the teeth on the pinions 6, 7 is immaterial to the operation described above. The pinions may have spur or helical teeth, the helices being of the same or of opposite sense. Thus, the most appropriate type of teeth can be selected having regard to the size of the thrust bearings 9, 10 and 11 and the characteristics of the driven moment.

The above-described device is further useful in taking up play between the intermeshing members, to which end an axial force is applied to the driving shaft 1.

Bearing in mind that the driving shaft 1 is capable of axial displacement as described, assume that a suitable force $Fa$ is applied to the shaft in order to displace it axially. As a result of this displacement and because of the opposite inclination of the helices of the splines 12, 13, the pinions 6, 7 will rotate in opposite directions until the play between the sets of teeth of the pinions 6, 7 as they mesh with the driven member 8 will be taken up.

The force $Fa$ gives rise to two opposite forces $FP6$, $FP7$ on mutual contact of the sets of teeth.

Apart from the friction, the forces will obey the following relationship:

$$FP6 = FP7 = \frac{d_6}{d_{12}} \frac{Fa}{2 tg \beta}$$

wherein $d_6$ and $d_{12}$ are the diameters of the pinions 6, 7 and the couplings between the pinions 6, 7 and the splines 12, 13, respectively, and $\beta$ is the helix angle of the splines 12, 13.

By applying the moment $Mm$ to the driving shaft 1 a resistance moment to the transmission member 8, $Ft$ being the corresponding tangential resistance force, balance will be afforded by the relationship:

$$Ft = FP7 - FP6$$

that is, as the resisting force $Ft$ increases, the tangential load on the pinion 7 increases and the load on the pinion 6 decreases.

As the play of the intermeshing sets of teeth is nil, the force $Ft$ is greater when the force $FP6$ is reduced to nil, that is, when the axial force $Fa$ is fully taken up by mutual driving contact between the pinion 6 and driven member 8.

Under such conditions $$FP6 = 0$$

$$FP7 = Ft \max = \frac{d_6}{d_{12}} \frac{Fa}{tg\beta}$$

The axial load $Fa$ may be provided by springs, which may be adjustable, or by a hydraulic or pneumatic pusher or by means capable of generating a force $Fa$ for fully taking up play, the force $Fa$ obeying the following relationship:

$$Fa = tg\beta \frac{d_{12}}{d_6} Ft \max.$$

Use of the device for taking up play in intermeshing is more particularly advantageous in digital control machines, wherein any play on intermeshing may give rise to instability of the servomechanisms or, in any event, reduce accuracy of the machine.

In the modified embodiment shown in FIG. 2, in which similar or corresponding parts are denoted by the same reference numerals, only the pinion 6 is capable of axial displacement relatively to the shaft, and cooperates with a splined coupling 12 as previously described.

The second pinion, which is denoted by 14, is rigidly connected to the shaft, for instance by being integral with the shaft.

The latter pinion is provided with a set of helical teeth meshing with an associated set of teeth on the driven member 8, the angle of the helix of the pinion 14 being opposite to the angle of the helix of the splined coupling 12.

The device of FIG. 2 is otherwise the same as that described above and illustrated in FIG. 1.

The sets of teeth on the pinions may in this case also be spur or helical teeth.

The device according to FIG. 1 or 2 may be advantageously used for reducing to one-half the width of the toothed face of a long driven rack or of a large-diameter driven ring gear.

To this end the pinions 6, 7 or 6, 14, respectively, are employed for transmitting motion to two adjacent gears 15, 16 (FIG. 3) meshing with the toothed face of the ring gear or rack.

The gear 15 is in this case the driven member 8 described above, and extends in an axial direction to permit intermeshing with both pinions 6, 7.

The mutual arrangement of the pinions and gears 15, 16 is selected for the angle defined by the straight center lines of the pinions and gears to be such that the sets of teeth in the intermeshing members are congruent.

Additionally, if the device is employed for taking up play, the spacing L of the axes of the gears 15, 16 should be an integral multiple of the pitch of the set of teeth.

Conversely, if the device is employed for the balanced transmission of forces over the gears 15, 16 in order to improve the evenness of transmission, the spacing L should be an odd multiple of half-pitches of the teeth.

FIG. 4 shows a further embodiment of the device for reducing to one-half width a band of teeth in a ring gear or rack.

The pinions each mesh with an associated toothed wheel 18, 19 fast with transmission gears 20, 21 meshing with the toothed band 17.

The arrangement is advantageous in that a wide relative rotation of the pinions 6 and 7 through at least one tooth pitch is possible, however the various sets of teeth may be oriented with respect to the splined connections.

Constructional details and embodiments may be widely varied with respect to the example described and shown without departing from the scope of the invention.

What I claim is:

1. A toothed meshing transmission mechanism including a driving wheel keyed to a driving shaft for relative axial displacement, a first and a second toothed pinion each coaxially connected to the driving shaft, at least the first pinion being capable of axial displacement relatively to the driving shaft, and a toothed driven member mounted to mesh with both the first and second pinions; at least the first pinion is keyed to the driving shaft by helical splines.

2. A transmission mechanism as claimed in claim 1, in which both pinions are connected to the driving shaft by means of matching helical splines to permit relative axial movement between the driving shaft and both pinions, the helices of the splined connections of the two pinions being oppositely inclined; and including means to hold the two pinions a constant distance apart from each other.

3. A transmission mechanism as claimed in claim 1, in which both pinions and the driven member have meshing spur teeth.

4. A transmission mechanism as claimed in claim 1, including means for applying an axial thrust to the driving shaft.

5. A transmission mechanism as claimed in claim 4, in which the said axial thrust obeys the relationship:

$$Fa = tg\beta \frac{d_{12}}{d_6} Ft \max$$

where $Fa$ is the axial thrust, $\beta$ is the angle of inclination of the helical splines on the driving shaft and both pinions, $d_{12}$ and $d_6$ are the diameters of the splined coupling and the pinions, respectively, and $Ft$ max is the highest value of the resulting tangential force applied to the driven member.

6. A transmission mechanism as claimed in claim 1, in which the second pinion is rigidly connected to the driving shaft and is provided with helical teeth meshing with an associated set of teeth on the driven member, the teeth on the second pinion being oppositely inclined to the helical splined connection between the first pinion and the driving shaft.

7. A transmission mechanism as claimed in claim 6, in which the first pinion has spur teeth.

8. A transmission mechanism as claimed in claim 6, in which the first pinion has helical teeth.

9. A transmission mechanism as claimed in claim 8, in which there is a mutual arrangement of the pinions and gears such that the angle defined by the straight center lines thereof is such that the teeth of the intermeshing members are congruent.

10. A transmission mechanism as claimed in claim 8, in which the space between the axes of the gears is an integral multiple of the tooth pitches.

11. A transmission mechanism as claimed in claim 8, in which the space between the axes of the gears is an odd integral multiple of half-tooth pitches.

12. A transmission mechanism as claimed in claim 1, in which the pinions transmit motion to two adjacent gears meshing with a toothed band on the driven member, the toothed band equally in width each pinion and one of the gears extending axially by an extent such as to mesh with both pinions in order to evenly distribute load over the gears.

13. A transmission mechanism as claimed in claim 1, in which the pinions each mesh with an associated toothed wheel (18, 19) fast with transmission gears that mesh with a toothed band (17) on the driven member.

References Cited

UNITED STATES PATENTS

| | | | |
|---|---|---|---|
| 2,386,367 | 10/1945 | Taylor | 74—410 |
| 2,698,013 | 12/1954 | Brill et al. | 74—410 |
| 2,712,761 | 7/1955 | Chung | 74—410 |
| 3,102,433 | 9/1963 | Stoeckicht | 74—410 |
| 3,176,532 | 4/1965 | Luenberger | 74—410 |
| 3,206,993 | 9/1965 | Niemann | 74—410 |

LEONARD H. GERIN, Primary Examiner

UNITED STATES PATENT OFFICE
CERTIFICATE OF CORRECTION

Patent No. 3,563,105      Dated February 16, 1971

Inventor(s) Roberto Graziosi

It is certified that error appears in the above-identified patent and that said Letters Patent are hereby corrected as shown below:

Before the ABSTRACT OF THE DISCLOSURE

Column 1, line 5, after "Meccanica," insert --R.T.M. --;

Before line 6, insert --Filed October 9, 1969 Ser. No. 865,093 --;

Signed and sealed this 17th day of August 1971.

(SEAL)
Attest:

EDWARD M. FLETCHER, JR.　　　　　　WILLIAM E. SCHUYLER, JR.
Attesting Officer　　　　　　　　　　Commissioner of Patents